March 18, 1969 R. G. HEINRICH 3,432,973
PRECISION CUTTING APPARATUS
Filed March 22, 1965 Sheet 2 of 4
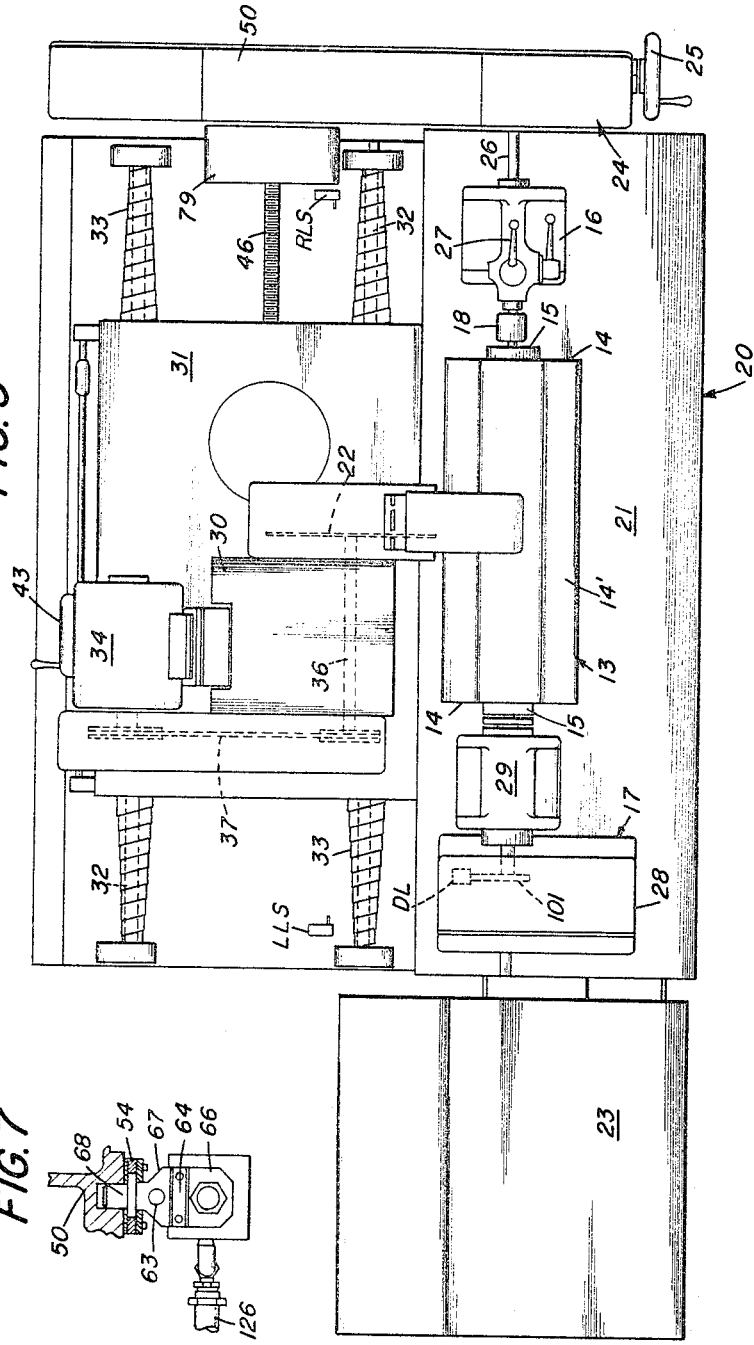
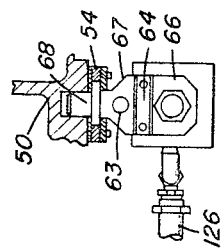
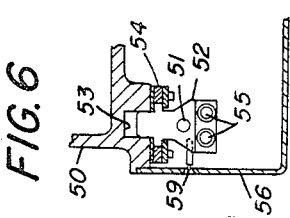
ROBERT G. HEINRICH
INVENTOR.
BY
AGENT

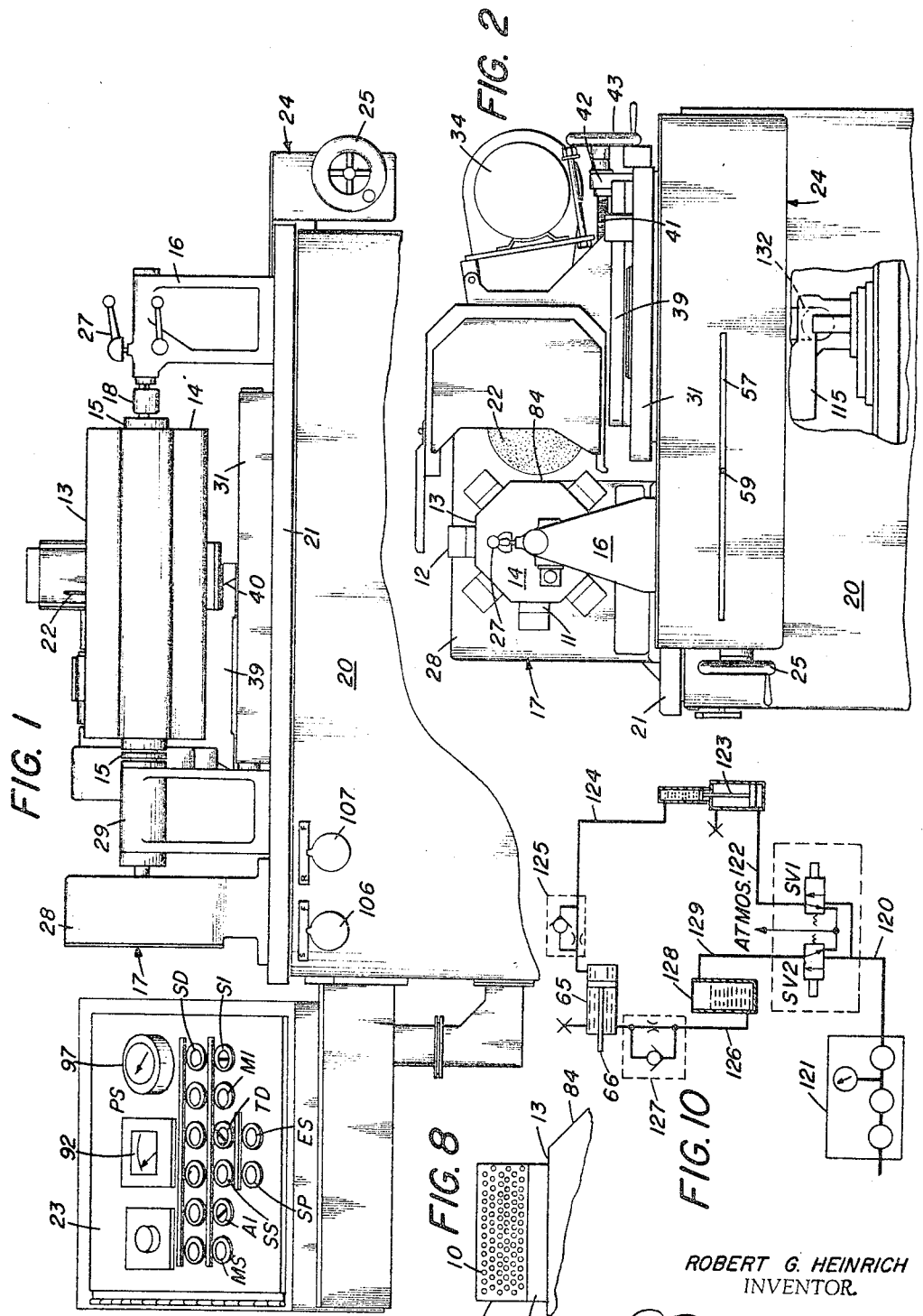

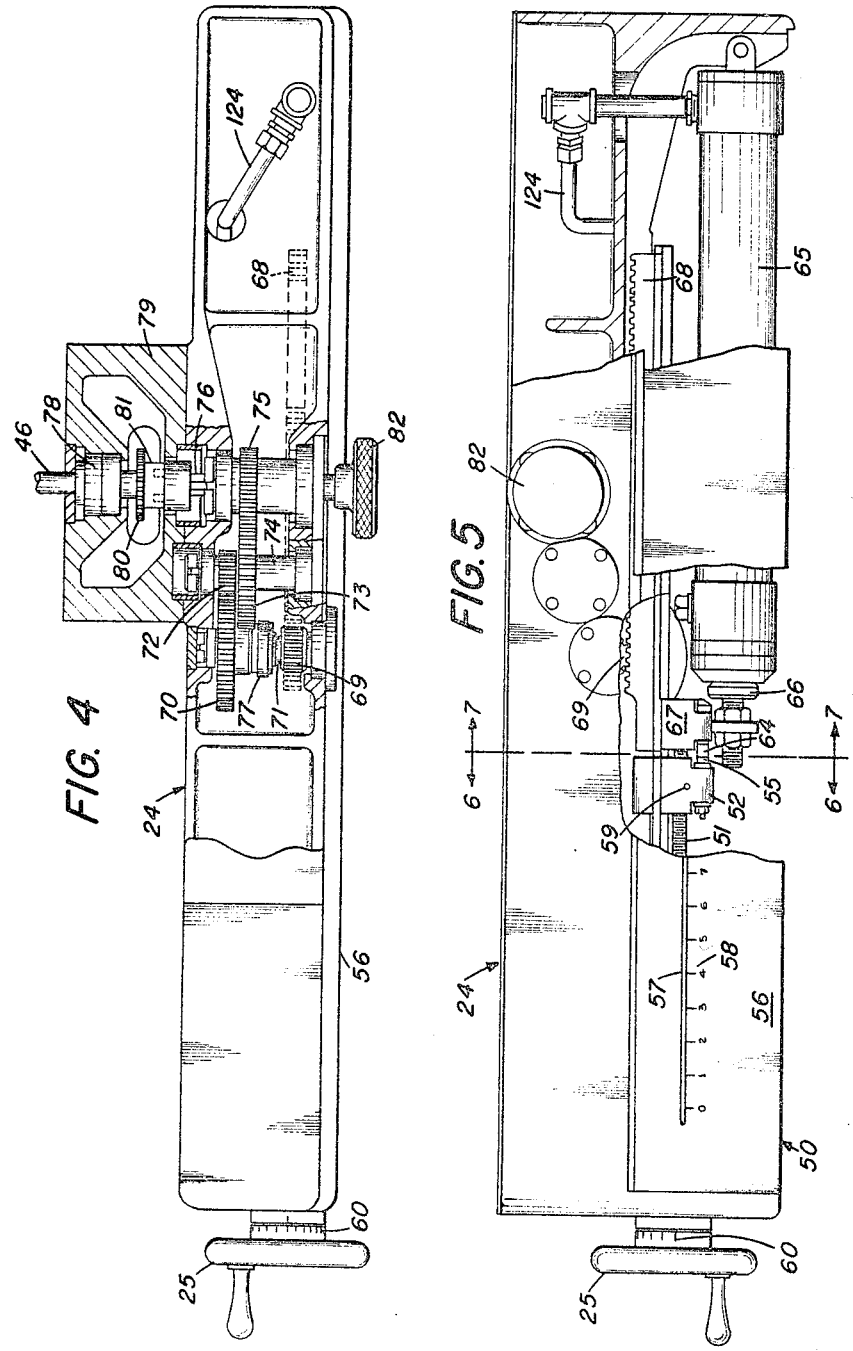

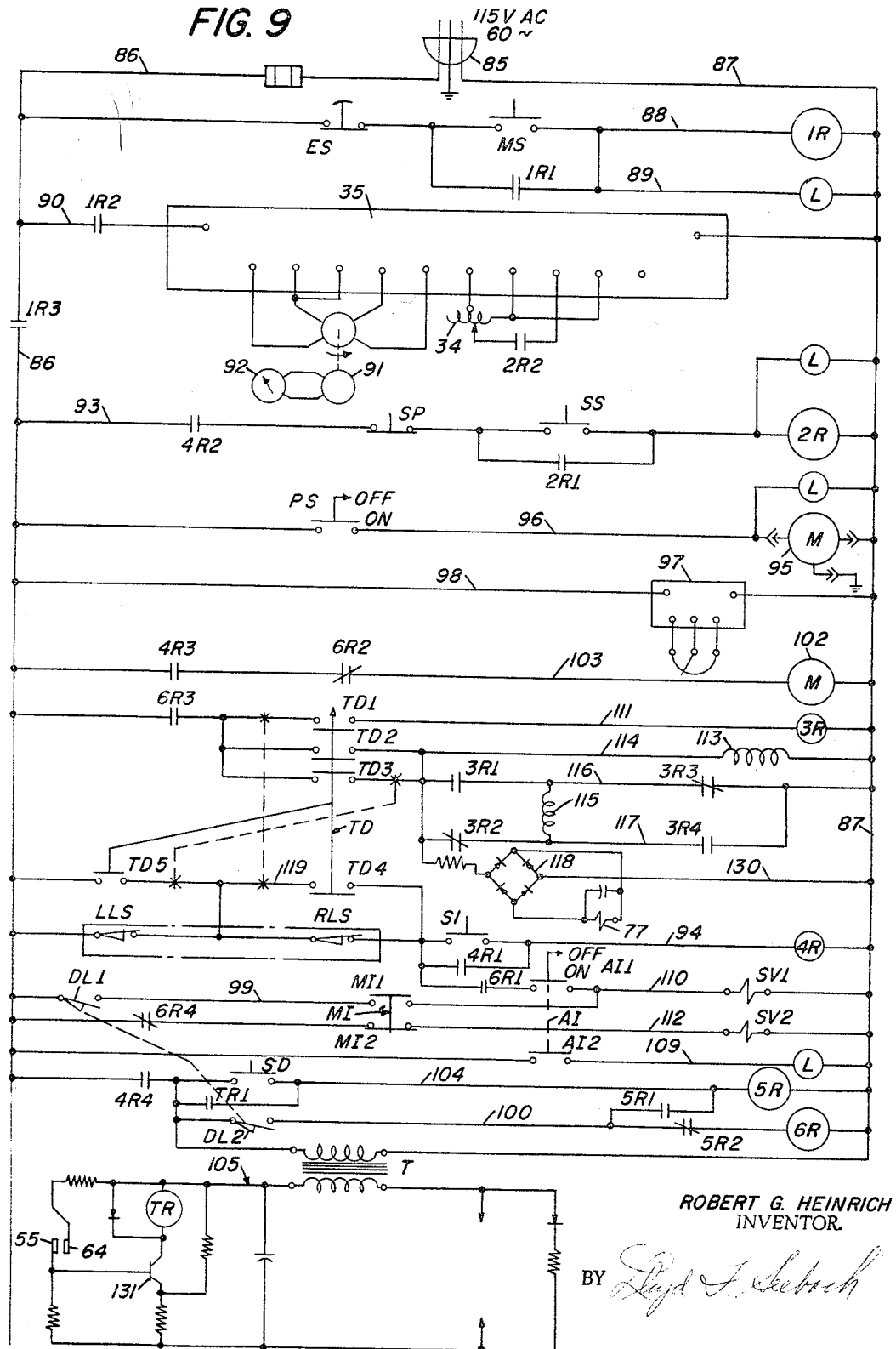

United States Patent Office 3,432,973
Patented Mar. 18, 1969

3,432,973
PRECISION CUTTING APPARATUS
Robert G. Heinrich, Rochester, N.Y., assignor to Hamco Machines and Electronics Corporation, Rochester, N.Y., a corporation of New York
Filed Mar. 22, 1965, Ser. No. 441,625
U.S. Cl. 51—108                                    12 Claims
Int. Cl. B24b 5/18, 47/02, 29/00

ABSTRACT OF THE DISCLOSURE

A precision cutting apparatus in which a plurality of elements to be cut is positioned in each of a number of spaced stations on a rotatable drum which moves each plurality of elements successively past a cutting member. The elements in each station are cut seriatim and the cutting member is then indexed axially relative to the drum for the next cutting operation. A blank station is used to establish a cycling period during which the cutting member is indexed.

---

The present invention relates to cutting apparatus and more particularly to cutting apparatus in which at least one of the elements to be cut is positioned in each of a number of spaced stations on a rotatable member and moved relative to a cutting member so that each element is cut seriatim into exact and equal lengths or thicknesses.

It is known to feed a discrete elongated element onto a rotatable drum that is provided with peripheral notches or other means for holding each element in a position thereon so that each element is moved past one or more aligned cutting members, such as rotatable circular saws. Such an arrangement requires a feeding device that insures proper orientation of each element relative to the drum. Since the element is usually separated from the drum after being cut by falling of its own weight from the notch in which it is retained during cutting thereof, the cutting action must be done at a position in which the element is most securely held by the notch and the cutting member bearing thereagainst, namely at a position intermediate the feeding station and the release station. Depending on the material that is being cut, any difference in sharpness and/or alignment of the cutting members can cause an erratic cutting action which, in turn, does not provide an accurately nor a smoothly cut surface. When a fragile material, such as glass, ceramic, crystal etc., is to be cut by an apparatus such as that just described, differences in sharpness and/or alignment of the cutting members can cause the entire element to crack or break so that it is completely wasted. In the case of certain ceramics and crystals, such waste introduces a cost factor that must be allocated to those elements that have been successfully cut, thereby increasing their cost considerably.

It is the primary object of the invention to provide a cutting device which eliminates the need for any further finishing of the cut surface.

A further object of the invention is to provide a cutting device in which a large number of elements to be cut can be arranged in each of several stations on a rotatable drum and cut seriatim into very exact lengths or thicknesses.

A still further object of the invention is to provide a device for cutting fragile materials in which the cutting element is moved cyclically into predetermined positions so as to provide successive cutting actions to produce elements that are of the same exact length or thicknesses.

Yet another object of the invention is to provide a cutting device by which successive automatic indexing of the cutting element relative to the material to be cut produces elements cut into the same exact length or thickness.

The invention overcomes the disadvantages of the prior art in that only a single cutting member is used and the material to be cut is fixed in a number of spaced positions on a rotatable drum which moves the material past the cutting member. However, no material is placed in one predesignated position on the drum because this preselected position, when it is located generally opposite the cutting member, is used to establish a cycling period during which the cutting member is indexed relative to the drum for making the next cut. The indexing of the cutting member is accomplished by mounting the cutting member and its driving source on a support member that can be moved axially with respect to the drum in very exact increments. By this arrangement the cutting member can be moved in each cycle any predetermined amount in accordance with the length or thickness requirement. Various controls and interlocks assure proper cycling and exact movement of the cutting member.

These and other objects and advantages of the invention will be apparent to those skilled in the art by the description which follows:

Reference is now made to the accompanying drawings wherein like reference numerals and characters designate like parts and wherein:

FIG. 1 is a front elevational view of a preferred embodiment of the invention;

FIG. 2 is a side elevational view of the device shown in FIG. 1;

FIG. 3 is a plan view of the device showing the arrangement of the cutting element and its supporting means in relation to the rotatable drum on which the material to be cut is mounted;

FIGS. 4 and 5 are, respectively, top and side views of the indexing mechanism with portions broken away to show specific structure in more detail;

FIGS. 6 and 7 are detail vertical sectional views taken along the lines 6—6 and 7—7 in FIG. 5;

FIG. 8 is a detail view of one station on the drum showing the manner in which material may be mounted thereon for cutting;

FIG. 9 is a schematic wiring diagram showing the various control circuits; and

FIG. 10 is a diagrammatic view of a pneumatic system for moving the cutting element.

In the cutting of various fragile materials, for example, that might be used in miniaturized electronic circuits or for laboratory purposes, it is often required that these materials be cut into very exact lengths or thicknesses. Also, the quantities involved may be such that it is not feasible to cut them individually and, as is known, if such materials are small in cross section but long in length, their handling and cutting can be facilitated by encapsulating a number of elements in a plastic or other material and then decapsulating after the cutting operation has been completed. For example, as shown in FIG. 8, a plurality of very small glass tubes 10 can be encapsulated in a plastic material and mounted on a block 11 which, in turn, is secured in any suitable manner to a surface or face 12 of a polygonal-shaped drum 13. Such a drum can be formed with end plates 14 and suitable surface plates 14' which are fabricated and assembled into a unit in any well known manner. The end plates 14 are provided with suitable bearing supports 15 so that the drum 13 can be mounted for rotation between a tail stock 16 and a suitable drive means as indicated by 17 in FIG. 3. In the disclosed embodiment of the invention, it is preferable that a polygonal-shaped drum be used. However, the drum 13 can be cylindrical and provided with the necessary slots and/or apertures to provide means for securing the elements to be cut, or suitable holders therefor, to the drum 13 at spaced positions thereon.

With reference particularly to FIGS. 1–3, a casing 20 carries a bedplate 21 on which the drum 13 and a cutting element 22 are mounted for movement as described hereinafter. At the left-hand side of the casing 20 a control panel 23 is shown and at the right-hand side an indexing control mechanism 24 is set by hand wheel 25, the operation of the control mechanism being described in more detail hereinafter.

The bedplate 21 is provided with a longitudinal slot 26 in which the tail stock 16 is accurately located. The tail stock is provided with a live center 18 that is movable axially and secured in a well known manner by means of a locking handle 27. The drive means 17 comprises a unit which includes a gear reduction drive 28 mounted on the bedplate 21 and connected to a suitable motor 102 mounted within the casing 20. The drum 13 is therefore mounted between a fixed bearing 29 and the live center 18, as shown in FIGS. 1 and 3.

To the rear side of the bedplate 21, see FIG. 3, a supporting member or plate 31 is slideably mounted on a pair of spaced rods 32 for supporting the cutting element 22 and its drive mechanism. The rods 32 are covered with a spirally-wound thin, metal ribbon 33 to prevent the cutting compound that may be used from coming in contact with the rods.

The drive mechanism for cutting element 22 comprises a motor 34 which is connected to an AC–DC drive control unit 35 mounted within casing 20. The cutting element 22 is mounted on a spindle 36 that is mounted in a bearing support 30 and connected by means of a belt and pulley system 37 to motor 34. The cutting element 22 is preferably a diamond cutting wheel; however, a thin, circular saw can be used depending on the type of material that is to be cut. The complete drive mechanism is mounted on a plate 39 that is slidably mounted on the plate 31 by a gib arrangement 40. As shown in FIG. 2, a lead screw 41 is rotatably mounted at one end in a bearing 42 on the end of plate 31 and threadably engages a nut (not shown) that is fixed to plate 39. By means of a hand wheel 43 fixed to the lead screw 41, the latter can be turned to move the cutting element 22 and its drive mechanism toward or away from the drum 13. The plate 31 also carries a fixed nut (not shown) on its underside which threadably engages a lead screw 46 that is arranged between the rods 32 and coupled to the indexing mechanism 24 in a manner to be described.

The indexing mechanism 24, see FIGS. 4 and 5, is arranged in a housing or casing 50 that is secured to or can be a part of plate 21 and comprises the hand wheel 25 and a lead screw 51 which is fixed at one end to the hand wheel 25 and rotatably journaled in the front face of housing 50. The other end of lead screw 51 threadably engages a nut 52 that is slideably mounted and retained within a groove 53 in housing 50 by a pair of gibs 54 as shown in FIG. 6. The right-hand end of nut 52, as seen in FIG. 5, carries a pair of contacts 55 which are more clearly shown in FIG. 6. The side 56 of housing 50 is provided with a slot 57 having a scale 58 arranged along one edge thereof as shown in FIG. 5. An indicator pin 59 is carried by a nut 52 and extends into slot 57 for indicating and setting the cyclic movement of the cutting element 22 relative to drum 13. This setting is accomplished by rotating hand wheel 25 which moves nut 52 along lead screw 51 to the desired position as indicated by scale 58 and a vernier scale 60 on hand wheel 25.

The means for controlling the preset cyclic movement of the cutting element 22 comprises a pneumatic cylinder 65 having a piston whose outer end 66 is connected to a stop member 67 having a clearance hole 63 through which lead screw 51 can pass, see FIG. 7. The stop member 67 is also slideably mounted and retained in groove 53 by means of gibs 54 and is connected to one end of a rack 68 that is also slideably mounted and retained in groove 53, see FIG. 7. Movement of rack 68, as described hereinafter, is transmitted through a train of gears, including gears 69 and 70 on a shaft 71, a pair of gears 72 and 73 on a shaft 74 and a gear 75 on shaft 76 that is coupled to lead screw 46, see FIG. 4. A one-direction clutch 77 is mounted on shaft 71 between gears 69 and 70 so that shaft 71 can be turned in one direction to rotate lead screw 46 and which permits rack 63 to be returned to its initial position without rotating lead screw 46. As shown in FIG. 4, the end of lead screw 46 is journaled in bearing 78 in a bearing support 79 that is secured to housing 50 and to plate 21 and carries a sprocket 80 which is secured to the end of the lead screw. The sprocket 80 is connected to shaft 76 by a pin clutch 81 fixed to shaft 76 and because the latter is keyed to and slideably mounted within gear 75 and has a knob 82 fixed to its outer end, movement of the knob in an axial direction away from housing 50 causes clutch 81 to be disengaged so that lead screw 46 is free of shaft 76 for a purpose to be described hereinafter.

The operation and cyclic functioning of the device as described thus far can be best explained when a cycle of operation is described in conjunction with the wiring diagram shown in FIG. 9. It must be assumed first of all that the device has been brought to a stop with a designated side 84 of drum 13 generally opposite the cutting element 22. The drum is removed from the apparatus by releasing handle 27 and moving the live center 18 axially in a direction away from drum 13. The material to be cut is mounted on each of the sides or surfaces 14′ of the drum with the exception of the one designated side 84. The drum is then remounted between the bearing 15 and the live center 18 with the designated side or surface 84 again opposite the cutting element 22. In order to automatically locate side 84 opposite cutting element 22, the bearing support 15 is provided with a key that engages a keyway in one end plate 14 of drum 13.

It is further assumed that the cutting element 22 has been positioned in a normal start position, which is at the left-hand end of drum 13, and in axial relation to the material, the indexing of cutting element 22 being from left to right as viewed in FIGS. 1 and 3. The hand wheel 43 is rotated in the proper direction to move cutting element 22 into a position with respect to drum 13 so that it can cut through all of the material to be cut and, if necessary, into the block 11 on which the material is mounted. Once the axial and depth positions of the cutting element 22 have been established, the hand wheel 25 is rotated in the proper direction to position pin 59 relative to the scale 58 and in conjunction with scale 60 for establishing an exact position of nut 52 in accordance with the required cyclic indexing of cutting element 22. A definite and exact linear separation between contacts 55 and 64 is therefore established.

Plug 85 is then inserted into a suitable outlet to provide a 115 volt A-C source of potential to the apparatus through lines 86 and 87. The Master Switch MS in line 88 is then closed thereby energizing relay 1R which, in turn, closes its contacts 1R1 in line 89, 1R2 in line 90 and 1R3 in line 86, the contact 1R1 holding in relay 1R when the switch MS is released. Line 88 also contains an Emergency Stop switch ES which can be actuated at any time to completely stop the device by breaking the circuit to relay 1R. The closing of contact 1R3 permits the potential to be applied to the rest of the circuitry. By closing contact 1R2 in line 90, motor control unit 35 is thereby energized. This unit is a commercially available converter which permits a D-C motor to be operated by an A-C source. The motor 34 for rotating cutting element 22 is not energized, however, until contact 2R2 is closed. The unit 35 includes a tachometer-generator 91 which is connected to an indicator 92 on the control panel 23. The circuit for rotation of cutting element 22 is completed with the closing of Spindle Start switch SS in line 93, providing the Start Index switch SI in line 94 has been closed, Spindle Stop switch SP in line 93 controlling any emergency stopping of the cutting element 22. The closing of switch SI energizes relay 4R through the Right and Left Limit switches LLS and RLS, and if switch SI is closed before switch SS, it is then possible to energize relay 2R upon closing switch SS. Relay 4R closes its contacts 4R1, 4R2, 4R3 and 4R4. With the closing of contact 4R2, relay 2R in line 93 is energized providing switch SS has been closed as explained above, thereby closing its contact 2R2 so that motor 34 is energized to drive the cutting element continuously, relay 2R being held in by its contact 2R1. The pump motor 95 in line 96 is energized when the Pump switch PS is closed. The rotational speed of drum 13 is derived from an r.p.m. indicator 97 in the line 98, the speed of drum 13 being adjusted by knob 106 through a mechanical control unit associated with motor 102 in accordance with the type of material that is to be cut and the direction being controlled by knob 107 that is associated with the same unit. The Auto Index switch AI having contacts in line 110 is then moved into its "On" position.

The drive means 17 for the drum 13 is provided with a Drum Limit switch having contacts DL1 and DL2 in lines 99 and 100, respectively, which are actuated into a closed position by a cam 101 on the output shaft of the reduction drive 28 when the designated side 84 of the drum 13 is generally opposite the cutting element 22. Therefore, at the start of a cycle the contacts DL1 and DL2 are being held in a closed position. Accordingly, with the contact 4R4 in line 104 closed, relay 6R is energized by virtue of contact DL2 being closed so that its contact 6R1 in line 110 is closed, contact 6R2 in line 103 is open, contact 6R3 in line 111 is closed and contact 6R4 in line 112 is opened. When Start Drum switch SD in line 104 is closed, relay 5R is energized and is held in by its contact 5R1 between lines 100 and 104, whereas contact 5R2 is opened thereby de-energizing relay 6R. The contact 6R2 of relay 6R therefore returns to its closed position so the drum motor 102 is energized to rotate the drum and move each block of elements to be cut successively past the cutting element 22 until the designated side 84 without any elements thereon is again opposite the cutting element. As soon as the drum 13 starts to rotate, the contacts DL1 and DL2 return to an open position thereby de-energizing relay 5R. Relay 6R is then conditioned for stopping the drum when a complete revolution thereof has been made.

When the designated side 84 without any elements thereon approaches the cutting element 22, contacts DL1 and DL2 are again closed. Contact DL2 causes energization of relay 6R and its contact 6R2 is opened to de-energize the motor 102. At the same time, contact 6R1 is closed so that the Solenoid Valve SV1 is energized. This valve connects the line 120 from pump 121 to line 122 that is connected to one side of piston 123, the latter being moved in a direction to force the liquid ahead of it through line 124 and a flow control valve 125 into cylinder 65 as shown in FIG. 10. As the pressure increases in cylinder 65, the piston is moved to the left and the liquid ahead of the piston is forced through line 126 and a flow control valve 127 into reservoir 128, the air in the latter exhausting to the atmosphere via line 129 and solenoid valve SV2. Stop member 67 is therefore moved to the left, as seen in FIG. 3, until it engages nut 52 at which time contacts 64 and 55 are closed to complete the D-C circuit 105 supplied by transformer T, see FIG. 9. The movement of stop member 67 moves racks 68 therewith which, in turn, through the gear train shown in FIG. 4 causes lead screw 46 to be turned in the proper direction for moving the plate 31 and the cutting element 22 with its drive mechanism to the right. This movement of the cutting element 22 is in accordance with the preselected position of nut 52 on the lead screw 51.

When the contacts 55 and 64 are closed, the D-C circuit 105 is completed and the transistor 131, upon being made conductive, causes energization of relay TR which, in turn, closes its contact TR1 which is in shunt with the Start Drum switch SD. As a result, relay 5R is energized and relay 6R is again de-energized as described above. The drum 13 therefore starts to rotate and at the same time contact 6R1 is opened to de-energize solenoid valve SV1 and contact 6R4 is closed which through the contact M12 of Manual Index switch MI energizes solenoid valve SV2. Valve SV2 connects pump 121 via lines 120 and 129, reservoir 128 and valve 127 to the other side of cylinder 65 so that the piston is moved in the opposite direction thereby breaking contacts 55 and 64. In view of the arrangement of clutch 77 and shaft 71, the return movement of stop member 67 and rack 68 has no effect on the rotation of lead screw 46. The contacts DL1 and DL2 therefore control the cyclic movement of cutting element 22 relative to the drum 13 and the elements mounted thereon to be cut. If for any reason cycling of cutting element 22 should be necessary without cutting the elements on drum 13, the switch MI is held closed so that, when the drum is in a stationary position, the solenoid valve SV1 can be energized to complete a cycle of operation. Upon release of switch MI, valve SV2 is immediately energized so that the cycling operation can continue on an automatic basis.

The cutting element 22 can be moved in either direction by a motor 113 in line 114 having a start winding 115, connected across lines 116 and 117, the motor being connected to sprocket 80 by a chain drive 132 as seen in FIG. 2. The continuous axial movement of cutting element 22 is controlled by a Table Direction switch TD which in one position closes its conatcts TD1 in line 111, TD2 in line 114 and TD4 in line 119. In this position, relay 3R in line 111 is energized and its contacts 3R1 and 3R4 are closed whereas contacts 3R2 and 3R3 are opened. Current then passes through the start winding 115 in one direction whereas in the other position contacts TD3 in line 116 and TD5 in line 119 are closed so that current passes through the winding 115 in an opposite direction. In either case, the current is changed to D-C by a rectifier 118 in line 130 for energizing clutch 77 so as to disengage the gear drive from the cylinder 65. When the table is to be moved, it is necessary that the knob 82 be pulled in an outward direction so as to disengage clutch 81 from the sprocket 80. The motor 113 therefore can drive the lead screw 46 in either direction depending on the position of the switch TD. If the table 31 is driven too far in either direction, one of switches LLS or RLS is actuated to an open position, thereby de-energizing the relay 4R. Because of the various interlocking controls, changing from manual to automatic indexing of the cutting element, or vice versa, or moving the cutting element axially with respect to the drum can be accomplished only when the predesignated side 84 of the drum 13 is generally opposite the cutting element 22. An indicator lamp L is shown in various circuits to provide a visual indication to the operator of the condition of its respective circuit.

The invention has been described in detail with particular reference to a preferred embodiment thereof, but it will be understood that variations and modifications can be effected within the spirit and scope of the invention as described hereinabove and as defined in the appended claims.

I claim:

1. A device for cutting seriatim at least one element positioned in one or more peripherally-spaced stations on a cyclically rotatable drum, except in a predesignated one of said stations, comprising in combination:

first drive means cyclically disconnectable from and connectable to said drum for rotating the latter;
cutting means rotatably mounted adjacent said drum;

second drive means coupled to said cutting means for rotating the latter;

cycling means responsive to said drum when said predesignated station is aligned with said cutting means for disconnecting and connecting said first drive means;

means responsive to said cycling means for establishing an interval between disconnection and connection of first drive means; and means coupled to said cutting means for moving the latter axially with respect to said drum during each said interval.

2. A device in accordance with claim 1 including means responsive to said drum for controlling the cyclic movement thereof.

3. A device in accordance with claim 1 including means actuated by said cutting means for limiting the number of cyclic movements thereof.

4. A device for cutting seriatim at least one element positioned on one or more sides of a cyclically rotatable polygonal drum, except on a predesignated one of said sides, comprising in combination:

first drive means cyclically disconnectable from and connectable to said drum for rotating the latter;

a rotatable cutting element;

means for supporting said cutting element adjacent said drum and in a cutting plane that is substantially perpendicular to the axis of said drum;

second drive means coupled to said cutting element for rotating the latter;

cycling means responsive to said drum when said predesignated side is generally opposite said cutting element for disconnecting and connecting said first drive means;

means responsive to said cycling means for establishing an interval between disconnection and connection of said first drive means; and means coupled to said supporting means for moving the latter axially with respect to said drum during each interval to position said cutting element in successive predetermined axial positions relative to said element.

5. A device in accordance with claim 4 including means responsive to said moving means for controlling movement of the latter in accordance with a selected cyclic axial movement of said cutting element.

6. A device in accordance with claim 4 including means responsive to movement of said supporting means for limiting the number of cyclic movements of said cutting element.

7. A device for cutting seriatim at least one element positioned on one or more sides of a cyclically rotatable polygonal drum, except on a predesignated one of said sides, comprising in combination:

first drive means cyclically disconnectable from and connectable to said drum for rotating the latter;

a rotatable and axially displaceable cutting element;

means for supporting said cutting element adjacent said drum and in a cutting plane that is substantially perpendicular to the axis of said drum;

means arranged on said supporting means and coupled to said cutting element for moving the latter toward and away from said drum to establish a depth of cut to sever each said element;

second drive means mounted on said support means and coupled to said cutting element for rotating the latter;

cycling means responsive to said drum when said predesignated side is generally adjacent said cutting element for disconnecting and connecting said first drive means;

means responsive to said cycling means for establishing an interval between disconnection and connection of said first drive means; and means coupled to said supporting means for moving the latter axially with respect to said drum during each interval to position said cutting element in successive predetermined axial positions relative to said element.

8. A device in accordance with claim 7 including means responsive to said means for moving said supporting means for controlling movement of the latter in accordance with a selected cyclic axial movement of said cutting element.

9. A device in accordance with claim 7 including means responsive to movement of said supporting means for limiting the number of cyclic movements thereof.

10. A device in accordance with claim 7 including manually responsive means for overriding said moving means during one of said intervals to move said supporting means into its next successive predetermined position.

11. A device in accordance with claim 8 wherein said controlling means comprises a first member selectively positioned along a rotatable member in accordance with a selected cyclic axial movement of said cutting element and a second member coupled to said means for moving said supporting means and pneumatically actuated in response to said cycling means into engagement with said first member.

12. A device in accordance with claim 8 wherein said cycling means comprises a pair of switches in the circuit of said first drive means, said switches being actuated by a cam rotatable with said drum in timed relation to the positioning of said predesignated side generally opposite said cutting element.

References Cited

UNITED STATES PATENTS

| 234,399 | 11/1880 | Garrett | 83—411 |
| 1,974,696 | 9/1934 | Swanson | 51—108 X |
| 1,820,330 | 1/1958 | Mahlmeister | 51—108 X |
| 3,073,074 | 1/1963 | Price | 51—215 X |

LESTER M. SWINGLE, Primary Examiner.

D. G. KELLY, Assistant Examiner.

U.S. Cl. X.R.

51—215; 83—411